United States Patent
Kato

(10) Patent No.: US 11,740,839 B2
(45) Date of Patent: Aug. 29, 2023

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Natsuko Kato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/711,468

(22) Filed: Apr. 1, 2022

(65) Prior Publication Data

US 2023/0062276 A1    Mar. 2, 2023

(30) Foreign Application Priority Data

Sep. 2, 2021   (JP) .................. 2021-143008

(51) Int. Cl.
   *G06F 3/12*        (2006.01)
(52) U.S. Cl.
   CPC ............ *G06F 3/1204* (2013.01); *G06F 3/126* (2013.01)

(58) Field of Classification Search
   None
   See application file for complete search history.

(56) References Cited

U.S. PATENT DOCUMENTS

| 2013/0135197 | A1* | 5/2013 | Kimura | G06F 3/013 345/156 |
| 2015/0029533 | A1* | 1/2015 | Sato | G06F 16/9562 358/1.14 |
| 2019/0303554 | A1* | 10/2019 | Yamashita | H04L 63/083 |

FOREIGN PATENT DOCUMENTS

| JP | 2004-110587 A | 4/2004 |
| JP | 2015-106314 A | 6/2015 |
| JP | 2017-062680 A | 3/2017 |

* cited by examiner

*Primary Examiner* — Frantz Bataille
(74) *Attorney, Agent, or Firm* — Oliff PLC

(57) ABSTRACT

An information processing apparatus includes a processor configured to display, on a display, a character string for identifying an apparatus that is connectable and an image showing the apparatus and a location at which the apparatus is installed.

20 Claims, 9 Drawing Sheets

| PRINTER NAME | IP ADDRESS | COLOR | LOCATION | ... | IMAGE |
|---|---|---|---|---|---|
| A001 | 111.11... | COLOR | 12TH FLOOR WEST | | img1.jpg |
| A002 | 111.12... | MONOCHROME | 12TH FLOOR EAST | | img2.jpg |
| B001 | 222.22... | COLOR | 10TH FLOOR EAST | | img3.jpg |

42

| PRINTER NAME | IP ADDRESS | COLOR | LOCATION | ... | IMAGE |
|---|---|---|---|---|---|
| A001 | 111.11... | COLOR | 12TH FLOOR WEST | | WINDOW —42 |
| A002 | 111.12... | MONOCHROME | 12TH FLOOR EAST | | BOOKSHELF —46 |

| PRINTER NAME | IP ADDRESS | COLOR | LOCATION | ... | IMAGE | |
|---|---|---|---|---|---|---|
| A001 | 111.11... | COLOR | 12TH FLOOR WEST | | IMAGE | ←52 |
| A002 | 111.12... | MONOCHROME | 12TH FLOOR EAST | | IMAGE | ←54 |

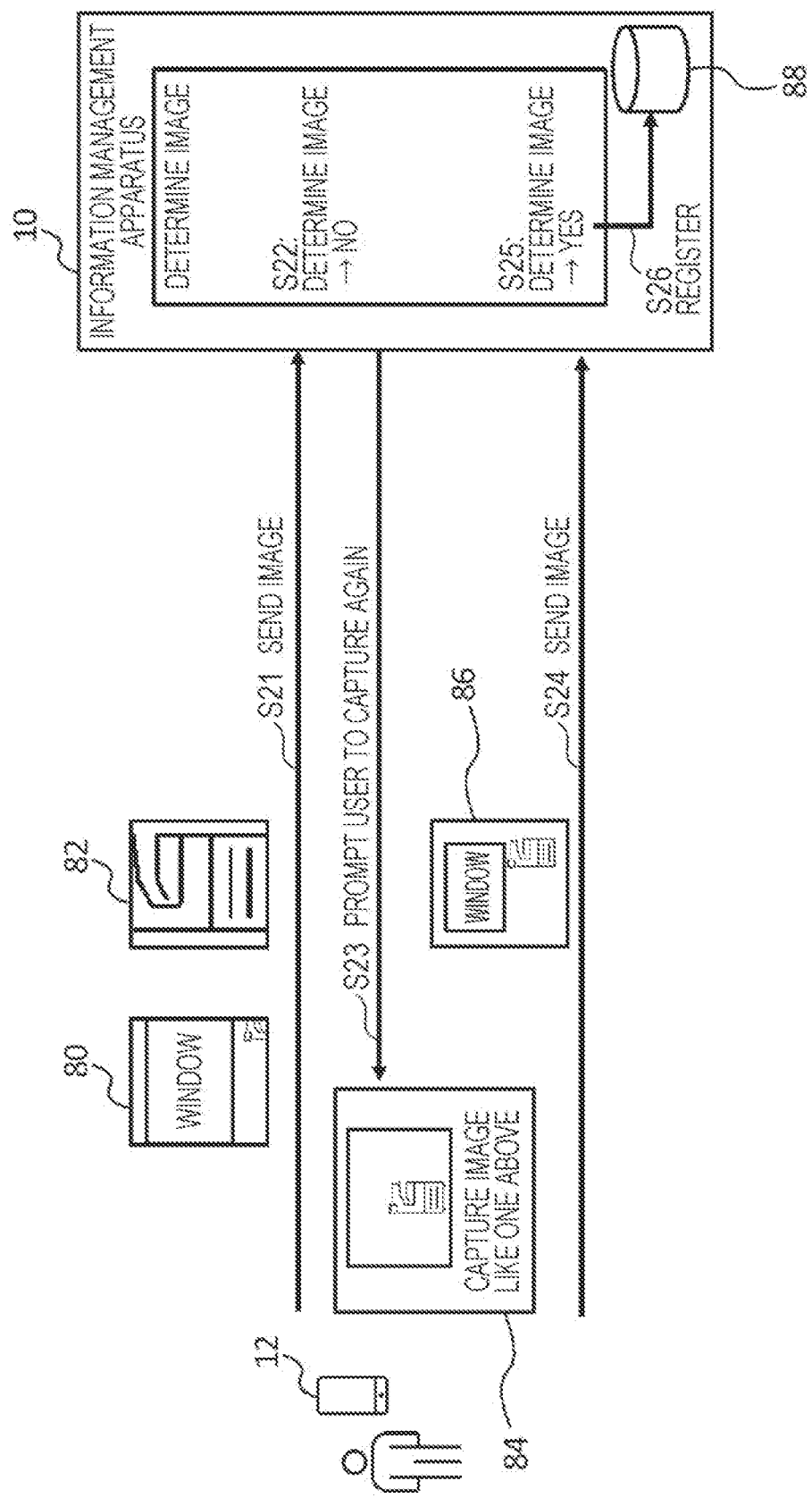

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2021-143008 filed Sep. 2, 2021.

BACKGROUND

(i) Technical Field

The present disclosure relates to an information processing apparatus, a non-transitory computer readable medium, and an information processing method.

(ii) Related Art

There is a case where character strings (e.g., character strings indicating names of apparatuses) for identifying connectable apparatuses (e.g., printers) are displayed on a terminal apparatus and a user selects an apparatus to be connected on the basis of the displayed character strings, and then the terminal apparatus connects to the apparatus selected by the user.

Japanese Unexamined Patent Application Publication No. 2017-062680 describes a system that registers identification information regarding a device and positional information regarding the device using a network camera while associating the identification information and the positional information with each other.

Japanese Unexamined Patent Application Publication No. 2004-110587 describes a system that registers printers connected to the Internet as search target printers and that posts data regarding the printers on the Internet.

Japanese Unexamined Patent Application Publication No. 2015-106314 describes a system that outputs client information regarding a client apparatus and device information regarding an image forming apparatus at a time of test printing, that extracts Internet protocol (IP) addresses and locations of the client apparatus and the image forming apparatus by capturing images of the client information and the device information, and that registers the client apparatus and the image forming apparatus on the basis of the IP addresses and the locations.

SUMMARY

If only character strings for identifying connectable apparatuses are displayed when a user selects an apparatus to be connected using a terminal apparatus, it might be difficult for the user to find a connectable apparatus intended by the user.

Aspects of non-limiting embodiments of the present disclosure relate to making it easier, when a user selects an apparatus to be connected, to identify the apparatus to be connected than when only character strings for identifying connectable apparatuses are displayed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to display, on a display, a character string for identifying an apparatus to be connected and an image showing the apparatus and a location at which the apparatus is installed.

BRIEF DESCRIPTION OF THE DRAWINGS

An exemplary embodiment of the present disclosure will be described in detail based on the following figures, wherein:

FIG. 18 is a diagram illustrating a process for determining an image.

DETAILED DESCRIPTION

Figure 1:
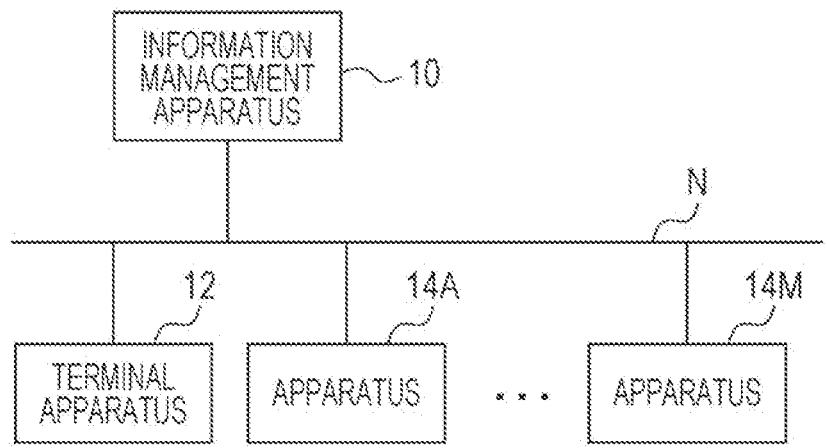
FIG. 1 is a block diagram illustrating the configuration of an information processing system according to an exemplary embodiment.

An information processing system according to an exemplary embodiment will be described with reference to FIG. 1. FIG. 1 illustrates an example of the configuration of the information processing system according to the exemplary embodiment.

The information processing system according to the exemplary embodiment includes an information management apparatus 10, a terminal apparatus 12, and one or plural apparatuses. In the example illustrated in FIG. 1, the information processing system includes, for example, apparatuses 14A to 14M. When the apparatuses 14A to 14M need not be distinguished from one another, the apparatuses 14A to 14M will be referred to as "apparatuses 14". FIG. 1 illustrates one terminal apparatus 12, but the information processing system may include plural terminal apparatuses 12, instead. The information management apparatus 10 may be achieved by a single apparatus or plural apparatuses.

The information management apparatus 10, the terminal apparatus 12, and the apparatuses 14 have a function of communicating with one another. The communication may be wired communication employing cable or wireless communication. That is, the apparatuses may be physically connected to one another by cable and communicate information with one another, or communicate information with one another through wireless communication. The wireless communication is, for example, short-distance wireless communication or Wi-Fi (registered trademark). The short-distance wireless communication is, for example, Bluetooth (registered trademark) or radio frequency identifier (RFID). In the example illustrated in FIG. 1, the apparatuses communicate with one another through a communication path N such as a local area network (LAN) or the Internet.

The information management apparatus 10 manages information regarding the apparatuses 14. The information regarding the apparatuses 14 will be referred to as "apparatus information" hereinafter.

The apparatus information includes information indicating character strings for identifying the apparatuses 14 and images showing the apparatuses 14 and locations at which the apparatuses 14 are installed. The apparatus information may also include information indicating performance or functions of the apparatuses 14 or information indicating the locations at which the apparatuses 14 are installed. The images showing the apparatuses 14 and the locations at which the apparatuses 14 are installed will be referred to as "apparatus images" hereinafter.

The character strings for identifying the apparatuses 14 are, for example, character strings indicating names of the apparatuses 14, character strings indicating IP addresses of the apparatuses 14, or character strings indicating media access control (MAC) addresses of the apparatuses 14. Images showing the names, the IP addresses, or the MAC addresses may be included in the apparatus information along with, or instead of, the information indicating the character strings. The IP addresses of the apparatuses 14 are an example of information for connecting to the apparatuses 14.

The information indicating the locations at which the apparatuses 14 are installed is, for example, positional information regarding the apparatuses 14 obtained using a global positioning system (GPS) or information indicating parts (e.g., rooms) of buildings in which the apparatuses 14 are installed.

The apparatus images include, for example, images showing features of the locations at which the apparatuses 14 are installed and are images with which the apparatuses 14 and the locations at which the apparatuses 14 are installed can be identified. The apparatus images may show appearances of the apparatuses 14 or internal structures of the apparatuses 14.

Information other than the apparatus images, that is, information other than the images showing the appearances or the internal structures of the apparatuses 14 is included in the apparatus information as the information indicating the character strings for identifying the apparatuses 14 or information for identifying the apparatuses 14 other than the character strings.

The terminal apparatus 12 is, for example, a personal computer (hereinafter referred to as a "PC"), a tablet PC, a smartphone, or a mobile telephone.

Each of the apparatuses 14 is, for example, a printer, a scanner, a copier, a fax machine, a multifunction device (e.g., a device having functions of printing, scanning, and copying), a PC, a display, a home appliance (e.g., an air conditioner, a lighting device, or a refrigerator), or another apparatus. These are examples of each of the apparatuses 14, and other apparatuses may be included in the information processing system as the apparatuses 14.

In the exemplary embodiment, the apparatus information is stored in the information management apparatus 10. For example, apparatus information regarding each of the apparatuses 14 is stored in and managed by the information management apparatus 10.

When a user requests a search for apparatuses 14 using the terminal apparatus 12, apparatus information regarding found apparatuses 14 is displayed on the terminal apparatus 12. For example, character strings (e.g., character strings indicating names of the apparatuses 14 or IP addresses) for identifying the found apparatuses 14 and apparatus images showing the apparatuses 14 and locations at which the apparatuses 14 are installed are displayed on the terminal apparatus 12.

Figure 2:
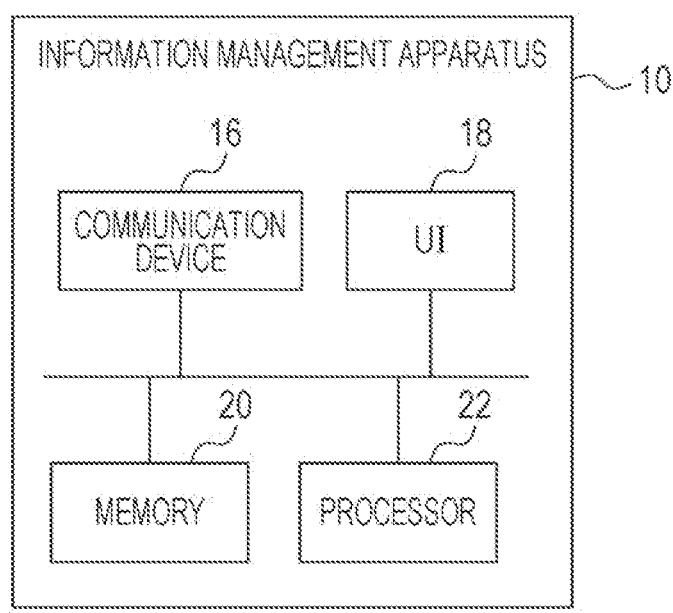
FIG. 2 is a block diagram illustrating the configuration of an information management apparatus.

The hardware configuration of the information management apparatus 10 will be described with reference to FIG. 2. FIG. 2 illustrates an example of the hardware configuration of the information management apparatus 10.

The information management apparatus 10 includes, for example, a communication device 16, a user interface (UI) 18, a memory 20, and a processor 22.

The communication device 16 is a communication interface including a communication chip, a communication circuit, or the like and has a function of transmitting information to other apparatuses and a function of receiving information from other apparatuses. The communication device 16 may have a wireless communication function or a wired communication function. The communication device 16 may communicate with other apparatuses, for example, using short-distance wireless communication or through the communication path N.

The UI 18 includes at least a display or an input device. The display is, for example, a liquid crystal display or an electroluminescent (EL) display. The input device is a keyboard, a pointing device (e.g., a mouse, a trackball, a touchpad, or a pen tablet), or the like. The UI 18 may be a touch panel or the like that includes both a display and an input device. The UI 18 may also include a microphone and/or a speaker.

The memory 20 achieves one or plural storage areas storing data. The memory 20 is, for example, a hard disk drive (HDD), a solid-state drive (SSD), one of various memories (e.g., a random-access memory (RAM), a dynamic random-access memory (DRAM), or a read-only memory (ROM)), another storage device (e.g., an optical disc), or any selective combination thereof. The information management apparatus 10 includes one or plural memories 20.

The memory 20 stores apparatus information. For example, the memory 20 stores the apparatus information regarding the apparatuses 14 to construct an apparatus information database. The information management apparatus 10 is an example of an image storage device.

The processor 22 is configured to control the operation of the components of the information management apparatus 10. The processor 22 may include a memory.

For example, the processor 22 searches the apparatus information database for apparatus information in accordance with a request for a search from the terminal apparatus 12 and extracts the apparatus information. The processor 22 then transmits the extracted apparatus information to the terminal apparatus 12. The processor 22 may display the extracted apparatus information on the terminal apparatus 12.

Figure 3:
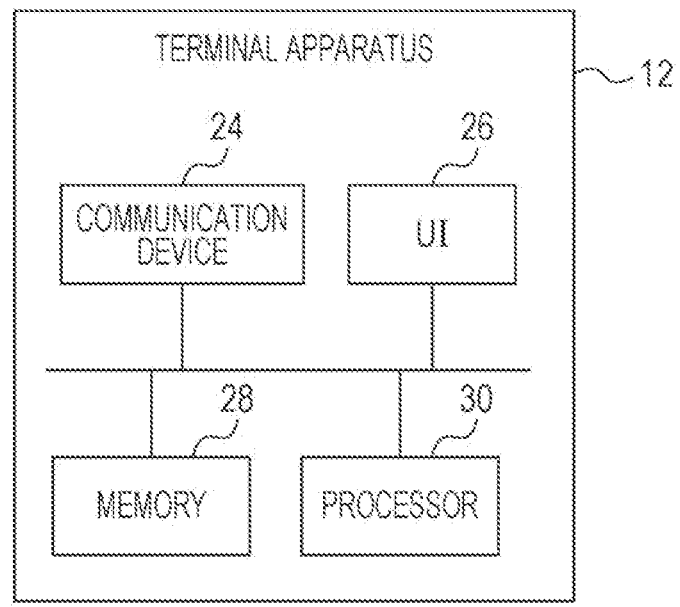
FIG. 3 is a block diagram illustrating the configuration of a terminal apparatus.

The hardware configuration of the terminal apparatus 12 will be described hereinafter with reference to FIG. 3. FIG. 3 illustrates an example of the hardware configuration of the terminal apparatus 12.

The terminal apparatus 12 includes, for example, a communication device 24, a UI 26, a memory 28, and a processor 30.

The communication device 24 is a communication interface including a communication chip, a communication circuit, or the like and has a function of transmitting information to other apparatuses and a function of receiving information from other apparatuses. The communication device 24 may have a wireless communication function or a wired communication function. The communication device 24 may communicate with other apparatuses, for example, using short-distance wireless communication or through the communication path N.

The UI 26 includes at least a display or an input device. The display is, for example, a liquid crystal display or an EL display. The input device is a keyboard, a pointing device (e.g., a mouse, a trackball, a touchpad, or a pen tablet), or the like. The UI 26 may be a touch panel or the like that functions as both a display and an input device. The UI 26 may also include a microphone and/or a speaker.

The memory 28 achieves one or plural storage areas storing data. The memory 28 is, for example, an HDD, an SSD, one of various memories (e.g., a RAM, a DRAM, or a ROM), another storage device (e.g., an optical disc), or any selective combination thereof. The terminal apparatus 12 includes one or plural memories 28.

The processor 30 is configured to control the operation of the components of the terminal apparatus 12. The processor 30 may include a memory.

The terminal apparatus 12 is used by the user. For example, the processor 30 of the terminal apparatus 12 accesses the apparatuses 14, requests the apparatuses 14 to perform processing, transmit information to the apparatuses 14, and receive information from the apparatuses 14 in accordance with instructions from the user. The processor 30 displays apparatus information received from the information management apparatus 10 on the display of the UI 26. For example, the processor 30 displays a character string for identifying one of the apparatuses 14 and an apparatus image of the apparatus 14 on the display of the UI 26.

The apparatus information regarding the apparatuses 14 may be stored in the memory 28 of the terminal apparatus 12. In this case, the processor 30 of the terminal apparatus 12 may display the apparatus information stored in the memory 28 on the display of the UI 26.

Figure 4:
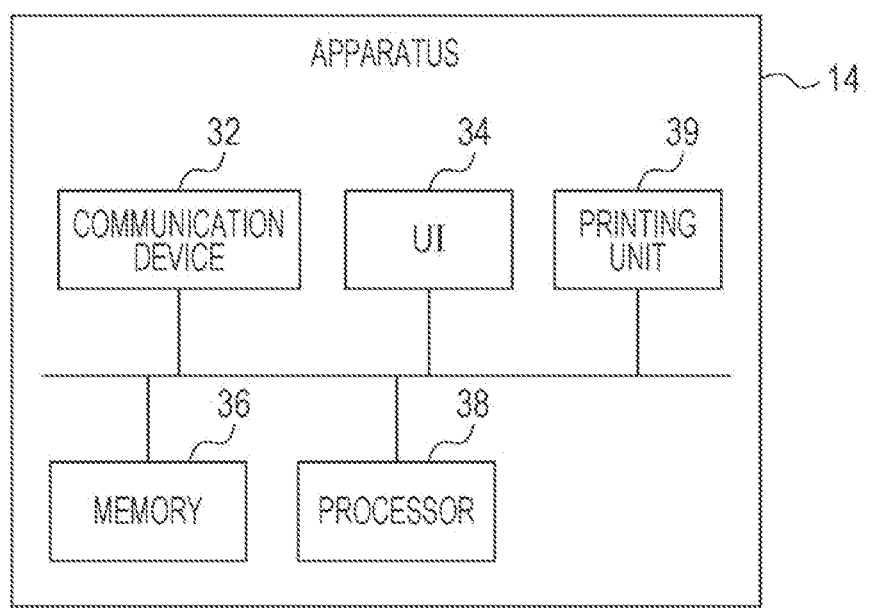
FIG. 4 is a block diagram illustrating the configuration of an apparatus.

The hardware configuration of the apparatuses 14 will be described hereinafter with reference to FIG. 4. FIG. 4 illustrates an example of the hardware configuration of one of the apparatuses 14. Here, for example, the apparatus 14 is a printer or a multifunction device including a printer.

The apparatus 14 illustrated in FIG. 4 includes, for example, a communication device 32, a UI 34, a memory 36, a processor 38, and a printing unit 39.

The communication device 32 is a communication interface including a communication chip, a communication circuit, or the like and has a function of transmitting information to other apparatuses and a function of receiving information from other apparatuses. The communication device 32 may have a wireless communication function or a wired communication function. The communication device 32 may communicate with other apparatuses, for example, using short-distance wireless communication or through the communication path N.

The UI 34 includes at least a display or an input device. The display is, for example, a liquid crystal display or an EL display. The input device is a keyboard, a pointing device (e.g., a mouse, a trackball, a touchpad, or a pen tablet), or the like. The UI 34 may be a touch panel or the like that functions as both a display and an input device. The UI 34 may also include a microphone and/or a speaker.

The memory 36 achieves one or plural storage areas storing data. The memory 36 is, for example, an HDD, an SSD, one of various memories (e.g., a RAM, a DRAM, or a ROM), another storage device (e.g., an optical disc), or any selective combination thereof. The apparatus 14 includes one or plural memories 36.

The processor 38 is configured to control the operation of the components of the apparatus 14. The processor 38 may include a memory.

The printing unit 39 forms, on a recording medium, images and documents to be printed. The images and documents to be printed are thus printed on the recording medium. Any printing method may be employed. For example, the printing unit 39 performs printing using an inkjet method, an electrophotographic method, a thermal method, a thermal transfer method, or the like.

For example, the terminal apparatus 12 transmits print data including images and documents to be printed and printing conditions to the apparatus 14, and the printing unit 39 prints the images and the documents on the recording medium.

The apparatus 14 illustrated in FIG. 4 includes a scanner. The scanner may generate images and perform copying. The images may be transmitted to the terminal apparatus 12. The apparatus 14 may also include a fax machine.

Processes performed by the information processing system will be described in detail hereinafter.

Registration of Apparatus 14

Figure 5:
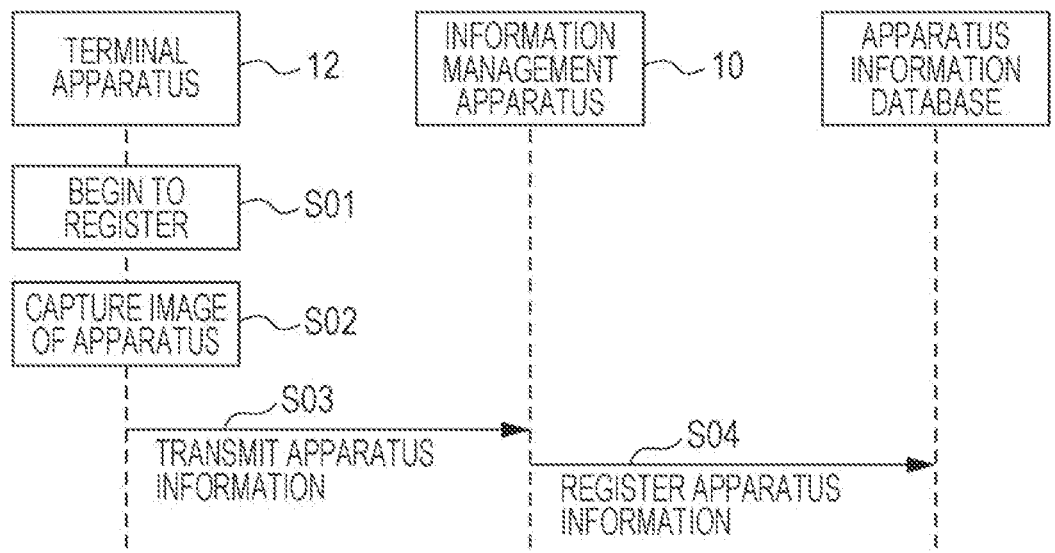
FIG. 5 is a flowchart illustrating a process for registering an apparatus.

A process for registering an apparatus 14 to the information management apparatus 10 will be described with reference to FIG. 5. FIG. 5 is a flowchart illustrating the process for registering an apparatus 14.

First, a manager begins to register an apparatus 14 using a terminal apparatus 12 therefor (S01). For example, application software for registering apparatuses 14 to the information management apparatus 10 is installed on the terminal apparatus 12, and the processor 30 of the terminal apparatus 12 activates the application software in accordance with an activation instruction from the manager. As a result, a registration screen is displayed on the display of the terminal apparatus 12.

Next, the manager captures, using a camera, an image of the apparatus 14 to be registered (S02). For example, the terminal apparatus 12 is provided with a camera, and the manager captures an image of the apparatus 14 to be registered using the camera of the terminal apparatus 12. At this time, the manager captures an image of the apparatus 14 and a location at which the apparatus 14 is installed such that the image includes the apparatus 14 and the location. For example, the manager captures, using the camera, an image of the apparatus 14 while including a scene around the apparatus 14 in the image. An apparatus image is thus generated. Alternatively, a camera that is not provided for the terminal apparatus 12 may be used to capture an image of the apparatus 14 to be registered, and a generated apparatus image may be transmitted to the terminal apparatus 12.

Next, the manager gives an instruction to register the apparatus 14 to be registered, and the processor 30 of the terminal apparatus 12 transmits apparatus information regarding the apparatus 14 to the information management apparatus 10 (S03). The apparatus information includes the apparatus image generated as a result of the capture in step S02. The manager also inputs, on the registration screen displayed on the display of the terminal apparatus 12, a character string for identifying the apparatus 14 to be registered (e.g., a character string indicating a name or an IP address of the apparatus 14), information indicating performance or functions of the apparatus 14, and information indicating the location at which the apparatus 14 is installed. The information input here is included in the apparatus information regarding the apparatus 14 and transmitted to the information management apparatus 10. Positional information regarding the terminal apparatus 12 may be obtained using a GPS function of the terminal apparatus 12 and included in the apparatus information as information indicating the location at which the apparatus 14 is installed, instead. The processor 30 of the terminal apparatus 12 may obtain the information indicating the character string for identifying the apparatus 14, the information indicating the performance or the functions of the apparatus 14, and the information indicating the location at which the apparatus 14 is installed and include the information in the apparatus information, instead.

The processor 22 of the information management apparatus 10 receives the apparatus information transmitted from the terminal apparatus 12, stores the apparatus information in the memory 20 of the information management apparatus 10, and registers the apparatus information to the apparatus information database constructed in the information management apparatus 10 (S04). As a result, the apparatus 14 to be registered is registered to the information management apparatus 10.

When the apparatus 14 is a printer, apparatus information regarding the printer is registered to the information management apparatus 10. For example, a character string indicating a name of the printer, an IP address of the printer, information indicating performance or functions of the printer, information indicating a location at which the printer is installed, and an apparatus image showing the printer and the location at which the printer is installed are registered to the information management apparatus 10 as apparatus information regarding the printer.

When an apparatus 14 is installed, for example, an image of the apparatus 14 is captured, and apparatus information regarding the apparatus 14 is registered to the information management apparatus 10. Alternatively, an image of an apparatus 14 may be captured and apparatus information may be registered to the information management apparatus 10 when the apparatus 14 is maintained, or an image of an apparatus 14 may be regularly captured and apparatus information may be registered to the information management apparatus 10. It is needless to say that the manager may capture an image of an apparatus 14 and register apparatus information to the information management apparatus 10 at any time. When apparatus information regarding an apparatus 14 is already registered in the information management apparatus 10, an image of the apparatus 14 may be newly captured, and apparatus information regarding the apparatus 14 registered in the information management apparatus 10 may be updated.

Search for Apparatus 14

Figure 6:
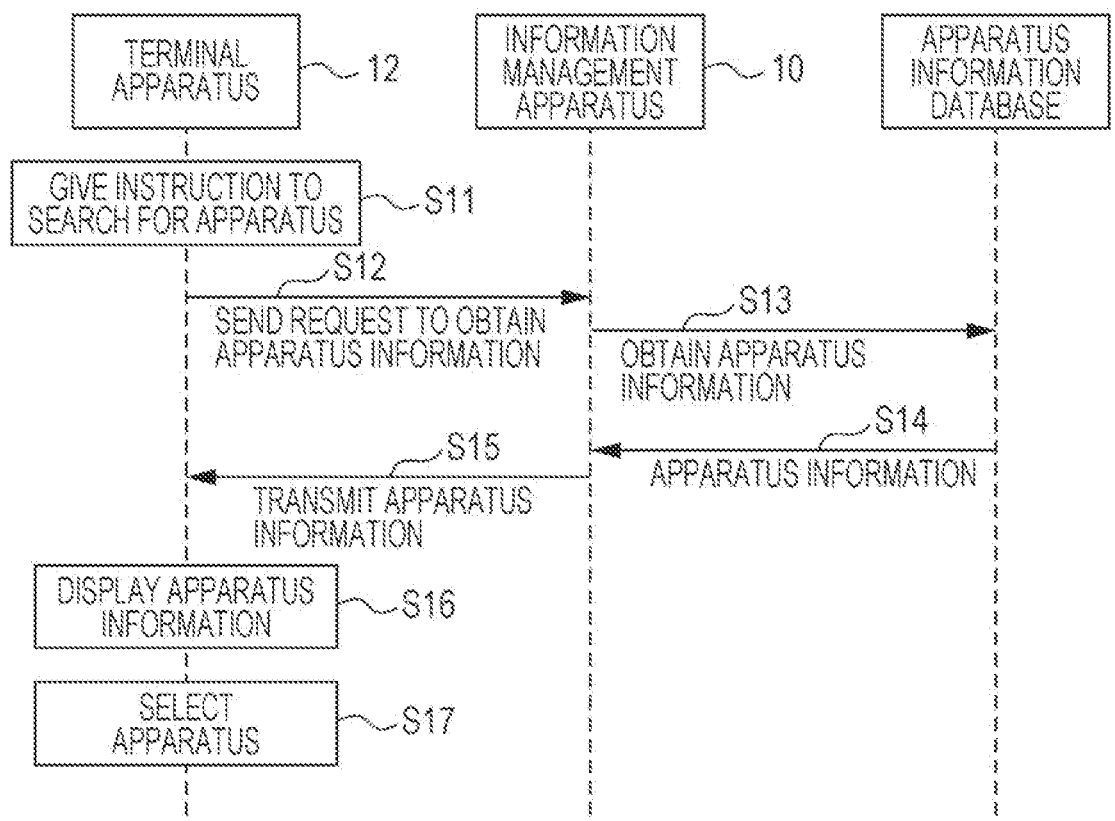
FIG. 6 is a flowchart illustrating a process for searching for an apparatus.

A process for searching for an apparatus 14 will be described hereinafter with reference to FIG. 6. FIG. 6 is a flowchart illustrating the process for searching for an apparatus 14.

First, a user who desires to use an apparatus 14 gives a terminal apparatus 12 owned thereby an instruction to search for a connectable apparatus 14 (S11). For example, the user gives the terminal apparatus 12 an instruction to search for an apparatus 14 connected to a network to which the terminal apparatus 12 is connected. For example, application software for using apparatuses 14 is installed on the terminal apparatus 12 owned by the user, and the processor 30 of the terminal apparatus 12 activates the application software in accordance with an activation instruction from the user. The user gives the search instruction using the application software. When an apparatus 14 to be connected is a printer, printing application software is installed on the terminal apparatus 12. The printing application software is activated, and the user gives an instruction to search for a connectable printer. Although the terminal apparatus 12 for the manager and the terminal apparatus 12 used by the user are given the same reference numerals for convenience of description, the manager and the user use their respective terminal apparatuses 12.

When receiving the search instruction from the user, the processor 30 of the terminal apparatus 12 transmits information indicating a request to obtain apparatus information to the information management apparatus 10 to request the information management apparatus 10 to obtain apparatus information (S12).

The processor 22 of the information management apparatus 10 searches the apparatus information database for apparatus information regarding an apparatus 14 connected to the network to which the terminal apparatus 12 owned by the user is connected and obtains the found apparatus information (S13 and S14). That is, the processor 22 of the information management apparatus 10 obtains, from the memory 20 of the information management apparatus 10, the apparatus information regarding the apparatus 14 connected to the network to which the terminal apparatus 12 owned by the user is connected. For example, the processor 22 of the information management apparatus 10 searches for apparatus information regarding an apparatus 14 having the same network address as the terminal apparatus 12 owned by the user.

Next, the processor 22 of the information management apparatus 10 transmits the apparatus information obtained from the apparatus information database to the terminal apparatus 12 owned by the user (S15).

Upon receiving the apparatus information from the information management apparatus 10, the processor 30 of the terminal apparatus 12 owned by the user displays the apparatus information on the display of the terminal apparatus 12 (S16). As a result, a character string for identifying the apparatus 14 and an apparatus image are displayed on the display. If apparatus information regarding plural apparatuses 14 has been obtained from the apparatus information database and transmitted to the terminal apparatus 12 owned by the user, the processor 30 of the terminal apparatus 12 displays a list of the apparatus information on the display of the terminal apparatus 12.

The user refers to the apparatus information displayed on the display of the terminal apparatus 12 and selects the apparatus 14 to be connected (S17). Since the apparatus image included in the apparatus information is displayed on the display, the user might select the apparatus 14 to be used thereby while comparing the apparatus image and an actual scene. If the apparatus 14 is installed in front of the user, for example, the user might determine whether the apparatus 14 installed in front of the user is the apparatus 14 to be used thereby by comparing a scene shown in the apparatus image (i.e., the apparatus 14 and a scene around the apparatus 14) and an actual scene in front of the user. If the user determines that the apparatus 14 installed in front of the user and the scene around the apparatus 14 are the same as or similar to the apparatus 14 and the scene shown in the apparatus image, the apparatus 14 installed in front of the user is likely to be the apparatus 14 to be used thereby.

After the user selects the apparatus 14 to be connected from the list of apparatus information, the processor 30 of the terminal apparatus 12 owned by the user connects, over the network, to the apparatus 14 selected by the user. The apparatus information regarding the apparatus 14 includes an IP address of the apparatus 14 as information for connecting to the apparatus 14. The processor 30 of the terminal apparatus 12 connects to the apparatus 14 over the network using the IP address of the apparatus 14.

When the apparatus 14 to be connected is a printer, the display of the terminal apparatus 12 owned by the user displays a list of apparatus information regarding printers. The user selects, from the list, a printer to be connected, and the processor 30 of the terminal apparatus 12 owned by the user connects, over the network, to the printer selected by the user. If the user selects an image or a document to be printed using printing application software and gives a print instruction, the processor 30 of the terminal apparatus 12 transmits print data including the image or the document to be printed and printing conditions to the printer selected by the user. Upon receiving the print data, the printer prints, on a recording medium such as sheets of paper, the image or the document to be printed.

If only the character strings for identifying the apparatuses 14 are displayed without the apparatus images being displayed during the selection of the apparatus 14 to be connected, the user undesirably selects the apparatus 14 to be used thereby while looking at only the character strings. When an apparatus 14 is installed in front of the user and a list of character strings for identifying the apparatuses 14 is displayed on the display of the terminal apparatus 12 without the apparatus images being displayed, for example, the user undesirably determines whether the apparatus 14 installed in front of the user is the apparatus 14 to be used thereby while looking at the list of character strings. For example, a list of character strings indicating names of printers, which are an example of the apparatuses 14, is displayed, and the user selects a printer while looking at the displayed character strings. Even when the user looks at the character strings indicating the names, however, it is difficult for the user to tell which of the apparatuses 14 is the apparatus 14 that the user desires to use. It is difficult for the user, for example, to tell whether the apparatus 14 installed in front of the user is the apparatus 14 that the user desires to use.

According to the exemplary embodiment, apparatus images showing the apparatuses 14 and locations at which the apparatuses 14 are installed are displayed, and the user selects an apparatus 14 to be connected while looking at the apparatus images of the apparatuses 14. When the user selects the apparatus 14 to be connected, therefore, it is easier for the user to identify the apparatus 14 to be connected than when only character strings for identifying connectable apparatuses 14 are displayed.

The exemplary embodiment will be described hereinafter in more detail in a specific example.

Registration of Apparatus 14

Figure 7:
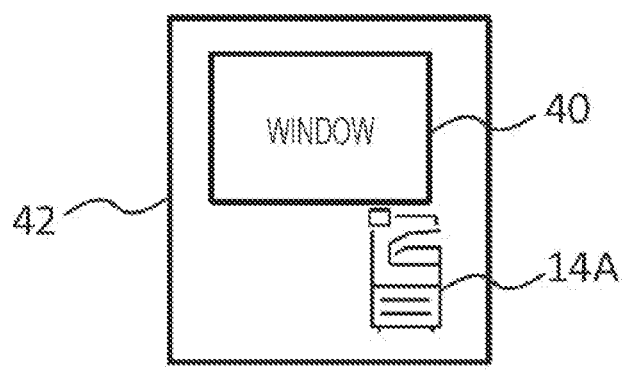
FIG. 7 is a diagram illustrating an apparatus image.
Figure 8:
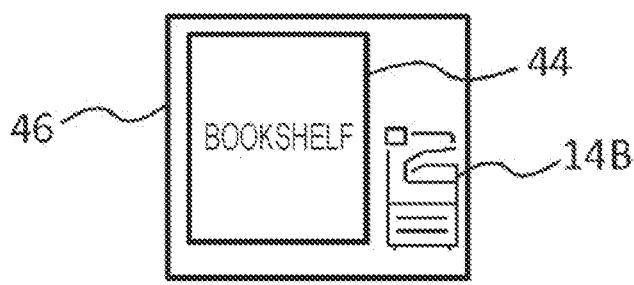
FIG. 8 is a diagram illustrating another apparatus image.
Figure 9:
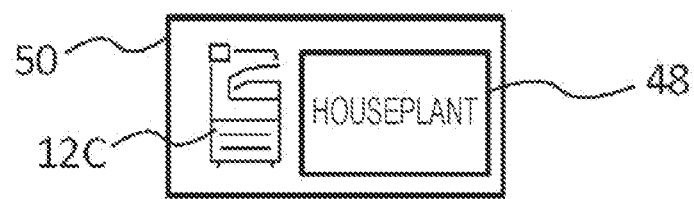
FIG. 9 is a diagram illustrating another apparatus image.

A specific example of the process for registering an apparatus 14 to the information management apparatus 10 will be described with reference to FIGS. 7 to 10. FIGS. 7 to 9 illustrate examples of an apparatus image.

For example, the manager enables a function of obtaining positional information (e.g., the GPS function) on the terminal apparatus 12 for the manager and captures an image of an apparatus 14 to be registered and a scene around the apparatus 14 using the camera included in the terminal apparatus 12. As a result, an apparatus image showing the apparatus 14 and the scene around the apparatus 14 is generated. Positional information indicating a position of the terminal apparatus 12 at a time of the capture is also obtained. The positional information is associated with apparatus information.

In the example illustrated in FIG. 7, an apparatus 14A to be registered is a printer. A window 40 is provided near the apparatus 14A. For example, the manager captures an image of the apparatus 14A and the window 40 using the camera included in the terminal apparatus 12. That is, the manager captures an image of the apparatus 14A and the window 40 by including the apparatus 14A and the window 40 in a capture range (i.e., a range corresponding to an image) of the camera included in the terminal apparatus 12. As a result of the capture, an apparatus image 42 showing the apparatus 14A and the window 40 is generated. Positional information indicating the position of the terminal apparatus 12 at the time of the capture is also obtained by the function of obtaining positional information, such as the GPS function.

The apparatus image 42 shows not only the apparatus 14A but also the scene around the apparatus 14A (e.g., a scene including the window 40). The scene around the apparatus 14A characterizes a location at which the apparatus 14A is installed. A part of the apparatus image 42 showing the scene around the apparatus 14A can be regarded as a part showing the location at which the apparatus 14A is installed.

Since the apparatus image 42 shows the window 40 near the apparatus 14A together with the apparatus 14A, the user understands from the apparatus image 42 that the window 40 exists near the apparatus 14A. That is, by looking at the apparatus image 42, the user recognizes characteristics of the location at which the apparatus 14A is installed.

For example, the manager inputs, on a registration screen displayed on the display of the terminal apparatus 12 owned thereby, a character string indicating a name of the apparatus 14A, an IP address of the apparatus 14A, information indicating performance or functions of the apparatus 14A, and information indicating the location at which the apparatus 14A is installed. The positional information obtained by the terminal apparatus 12 owned by the manager using the function of obtaining positional information may be used as the information indicating the location at which the apparatus 14A is installed. The positional information is actually information indicating a position of the terminal apparatus 12 for the manager, but since the manager has captured the image of the apparatus 14A near the apparatus 14A, the positional information indicates an approximate position of the apparatus 14A. Alternatively, the apparatus 14A may obtain positional information regarding the apparatus 14A using a function of obtaining positional function and transmit the positional information to the terminal apparatus 12, and the positional information may be used as the information indicating the location at which the apparatus 14A is installed.

When the manager gives the terminal apparatus 12 therefor an instruction to register the apparatus 14A, the processor 30 of the terminal apparatus 12 transmits, to the information management apparatus 10, the apparatus information regarding the apparatus 14A including the apparatus image 42 and various pieces of information (e.g., a character string indicating the name, the IP address, the information indicating the performance or the functions, and the information indicating the location (e.g., positional information)).

The processor 22 of the information management apparatus 10 receives the apparatus information regarding the apparatus 14A transmitted from the terminal apparatus 12, stores the apparatus information regarding the apparatus 14A in the memory 20 of the information management apparatus 10, and registers the apparatus information to the apparatus information database. The apparatus 14A is thus registered to the information management apparatus 10.

FIG. 8 illustrates another example of the captured image. An apparatus 14B to be registered is a printer. A bookshelf 44 is provided near the apparatus 14B. The manager captures an image of the apparatus 14B and the bookshelf 44 using the camera included in the terminal apparatus 12. As a result of the capture, an apparatus image 46 showing the apparatus 14B and the bookshelf 44 is generated. Positional information indicating a position of the terminal apparatus 12 at a time of the capture is also obtained by the function of obtaining positional information, such as the GPS function.

The apparatus image 46 shows not only the apparatus 14B but also a scene around the apparatus 14B (e.g., a scene including the bookshelf 44). The scene around the apparatus 14B characterizes a location at which the apparatus 14B is installed. A part of the apparatus image 46 showing the scene around the apparatus 14B can be regarded as a part showing the location at which the apparatus 14B is installed.

As in the case of the apparatus image 42 illustrated in FIG. 7, a character string indicating a name of the apparatus 14B, an IP address of the apparatus 14B, information indicating performance or functions of the apparatus 14B, and information indicating the location at which the apparatus 14B is installed (e.g., the positional information obtained by the function of obtaining positional information) are input.

When the manager gives the terminal apparatus 12 an instruction to register the apparatus 14B, the processor 30 of the terminal apparatus 12 transmits, to the information management apparatus 10, apparatus information regarding the apparatus 14B including the apparatus image 46 and various pieces of information (e.g., the character string indicating the name, the IP address, the information indicating the performance or the functions, and the information indicating the location (e.g., positional information)).

The apparatus information regarding the apparatus 14B is stored in the memory 20 of the information management apparatus 10 and registered to the apparatus information database. The apparatus 14B is thus registered to the information management apparatus 10.

FIG. 9 illustrates another example of the captured image. An apparatus 14C to be registered is a printer. A houseplant 48 is provided near the apparatus 14C. The manager captures an image of the apparatus 14C and the houseplant 48 using a camera included in the terminal apparatus 12. As a result of the capture, an apparatus image 50 showing the apparatus 14C and the houseplant 48 is generated. Positional information indicating a position of the terminal apparatus 12 at a time of the capture is also obtained by the function of obtaining positional information, such as the GPS function.

The apparatus image 50 shows not only the apparatus 14 but also a scene around the apparatus 14C (e.g., a scene including the houseplant 48). The scene around the apparatus 14C characterizes a location at which the apparatus 14C is installed. A part of the apparatus image 50 showing the scene around the apparatus 14C can be regarded as a part showing the location at which the apparatus 14C is installed.

As in the case of the apparatus image 42 illustrated in FIG. 7, a character string indicating a name of the apparatus 14C, an IP address of the apparatus 14C, information indicating performance or functions of the apparatus 14C, and information indicating the location at which the apparatus 14C is installed (e.g., the positional information obtained by the function of obtaining positional information) are input.

When the manager gives the terminal apparatus 12 an instruction to register the apparatus 14C, the processor 30 of the terminal apparatus 12 transmits, to the information management apparatus 10, apparatus information regarding the apparatus 14C including the apparatus image 50 and various pieces of information (e.g., the character string indicating the name, the IP address, the information indicating the performance or the functions, and the information indicating the location (e.g., positional information)).

The apparatus information regarding the apparatus 14C is stored in the memory 20 of the information management apparatus 10 and registered to the apparatus information database. The apparatus 14C is thus registered to the information management apparatus 10.

Figures 10, 11:
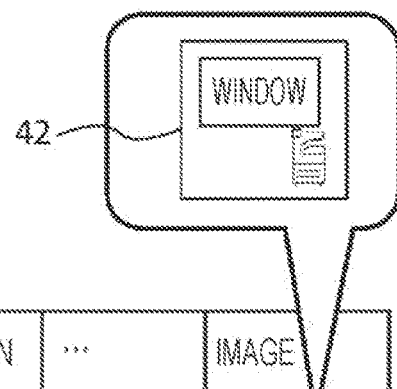
FIG. 10 is a diagram illustrating an apparatus information database.
FIG. 11 is a diagram illustrating results of a search for apparatuses.

FIG. 10 illustrates an example of the apparatus information database.

In the apparatus information database, a character string indicating a name of an apparatus 14, an IP address of the apparatus 14, information indicating performance or functions of the apparatus 14, information indicating a location at which the apparatus 14 is installed (e.g., positional information), and an apparatus image showing the apparatus 14 and the location at which the apparatus 14 is installed are associated with one another for each apparatus 14.

FIG. 10 illustrates the apparatus information regarding the apparatuses 14A to 14C illustrated in FIGS. 7 to 9, respectively. In FIG. 10, a function of a printer is shown as a function of each of the apparatuses 14A to 14C, namely color printing or monochrome printing.

The name of the apparatus 14A is, for example, "A001". The apparatus 14A has a function of "color printing" and is installed at a location "12th floor west". The apparatus image 42 is registered in the apparatus information database as an apparatus image of the apparatus 14A. A file name of the apparatus image 42 is "img1.jpg".

A name of the apparatus 14B is "A002". The apparatus 14B has a function of "monochrome printing" instead of "color printing" and is installed at a location "12th floor east". The apparatus image 46 is registered in the apparatus information database as an apparatus image of the apparatus 14B. A file name of the apparatus image 46 is "img2.jpg".

A name of the apparatus 14C is "B002". The apparatus 14C has the function of "color printing" and is installed at a location "10th floor east". The apparatus image 50 is registered in the apparatus information database as an apparatus image of the apparatus 14C. A file name of the apparatus image 50 is "img3.jpg".

Search for Apparatuses 14

Figures 12, 13:
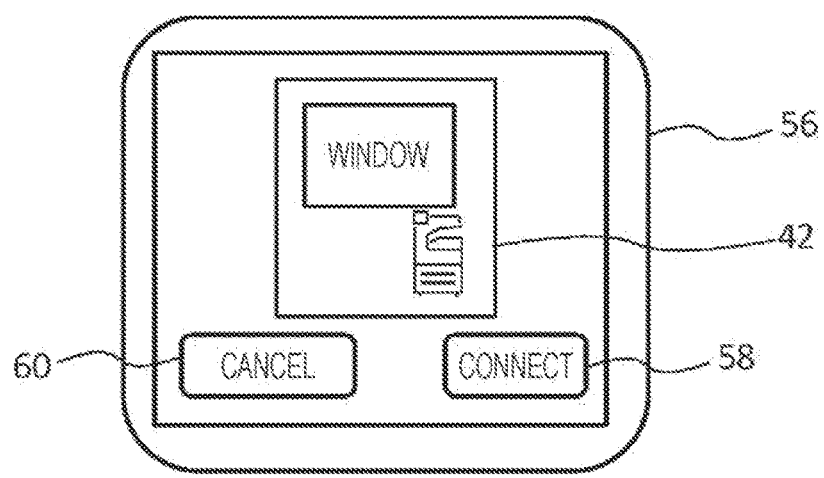
FIG. 12 is a diagram illustrating the results of the search for apparatuses.
FIG. 13 is a diagram illustrating a connection screen.

A process performed when apparatuses 14 are searched for will be described with reference to FIGS. 11 to 13. FIGS. 11 and 12 are diagrams illustrating results of a search for apparatuses 14. FIG. 13 is a diagram illustrating a screen for connecting to one of the apparatuses 14. Here, the apparatuses 14 are printers, for example, and the user searches for printers.

First, a user who desires to use a printer gives a terminal apparatus 12 owned thereby an instruction to search for connectable printers. Here, for example, the user gives an instruction to search for printers connected to the network to which the terminal apparatus 12 is connected. Printing application software is installed on the terminal apparatus 12 owned by the user, for example, and the user activates the printing application software on the terminal apparatus 12 and gives an instruction to search for connectable printers.

When the user gives the instruction, the processor 30 of the terminal apparatus 12 transmits, to the information management apparatus 10, information indicating a request to obtain apparatus information regarding printers.

The processor 22 of the information management apparatus 10 searches the database illustrated in FIG. 10, for example, for apparatus information regarding the printers connected to the network to which the terminal apparatus 12 owned by the user is connected and obtains found apparatus information. For example, the processor 22 of the information management apparatus 10 searches for and obtains apparatus information regarding printers having the same network address as the terminal apparatus 12 owned by the user. The processor 22 of the information management apparatus 10 transmits the obtained apparatus information to the terminal apparatus 12 owned by the user.

The processor 30 of the terminal apparatus 12 receives the apparatus information transmitted from the information management apparatus 10 and displays the received apparatus information on the display of the terminal apparatus 12. For example, a list of apparatus information is displayed on the display.

FIG. 11 illustrates an example of the list of apparatus information. The apparatus 14A, whose name is "A001" and the apparatus 14B, whose name is "A002", for example, are connected to the network to which the terminal apparatus 12 owned by the user is connected. Apparatus information regarding the apparatuses 14A and 14B has been searched for and displayed on the display of the terminal apparatus 12 owned by the user.

As illustrated in FIG. 11, the character strings indicating the names of the apparatuses 14A and 14B, the IP addresses of the apparatuses 14A and 14B, the information regarding the performance or the functions of the apparatuses 14A and 14B, the information indicating the locations at which the apparatuses 14A and 14B are installed, and the apparatus images are displayed on the display of the terminal apparatus 12. For example, thumbnails of the apparatus images are displayed.

Not only the character string indicating the name of the apparatus 14A but also the apparatus image 42 of the apparatus 14A is displayed. The same holds for the apparatus 14B, that is, not only the character string indicating the name of the apparatus 14B but also the apparatus image 46 of the apparatus 14B is displayed.

For example, the user can determine whether an actual printer in front of the user is a printer to be used thereby by comparing the apparatus images 42 and 46 displayed on the display of the terminal apparatus 12 owned thereby with the printer in front of the user and an actual scene around the printer.

In a specific example, the user who desires to use the apparatus 14A goes to the front of the apparatus 14A and recognizes that the apparatus 14A in front of the user is the printer whose name is "A001" by comparing the actual apparatus 14A and the scene around the apparatus 14A with the apparatus image 42 displayed on the display. The user can thus determine whether a connectable apparatus 14 and an apparatus 14 that the user is going to use are the same by comparing an apparatus image and an actual scene.

In the example illustrated in FIG. 11, the apparatus images are included in the list of apparatus information. The apparatus images, however, need not be included in the list, and access information for accessing the apparatus images may be included in the list, instead.

Access information is, for example, an address (e.g., a uniform resource locators (URL)) indicating an address at which an apparatus image is stored. When the user uses the access information (e.g., when the user clicks or touches the access information on a screen), the processor 30 of the terminal apparatus 12 accesses a corresponding address, obtains an apparatus image stored at the address, and displays the apparatus image on the display of the terminal apparatus 12.

In the example illustrated in FIG. 12, access information regarding the apparatus images 42 and 46 is displayed in the list of results of a search for apparatus information instead of the apparatus images 42 and 46. For example, a link 52 indicates an address at which apparatus image 42 is stored, and a link 54 indicates an address at which the apparatus image 46 is stored.

When the user clicks or touches the link 52 displayed on the display using the terminal apparatus 12, for example, the processor 30 of the terminal apparatus 12 accesses the address indicated by the link 52, obtains the apparatus image 42, and displays the apparatus image 42 on the display of the terminal apparatus 12. The apparatus image 42 is stored in the memory 20 of the information management apparatus 10. The processor 30 of the terminal apparatus 12 accesses the information management apparatus 10 and obtains the apparatus image 42 stored at the address indicated by the link 52. The same holds for the apparatus image 46.

FIG. 13 illustrates a screen 56 for connecting to one of the apparatuses 14. When the user selects one of the printers from the list illustrated in FIG. 11, or when the user uses one of the links on the list illustrated in FIG. 12 and an apparatus image is obtained, for example, the processor 30 of the terminal apparatus 12 displays the connection screen 56 on the display of the terminal apparatus 12. The processor 30 of the terminal apparatus 12 displays the apparatus image of the selected printer or the obtained apparatus image in the screen 56.

In the example illustrated in FIG. 13, the user has selected the apparatus 14A, and the apparatus image 42 of the apparatus 14A is displayed in the screen 56. At this stage, too, the user may determine whether the apparatus 14A is an apparatus to be actually used by the user by comparing the apparatus image 42 displayed in the screen 56 with an actual printer and a scene around the printer.

The screen 56 includes a button 58 for requesting connection and a button 60 for canceling connection.

If the user presses the button 58 (e.g., if the user clicks or touches the button 58) on the screen 56, the processor 30 of the terminal apparatus 12 connects to the apparatus 14A over the network. If the user gives the terminal apparatus 12 an instruction to perform printing, the processor 30 of the terminal apparatus 12 transmits print data to be printed to the apparatus 14A to request printing. Upon receiving the print data transmitted from the terminal apparatus 12, the apparatus 14A performs printing in accordance with the request.

If the user presses the button 60 on the screen 56, the processor 30 of the terminal apparatus 12 removes the connection screen 56 from the display and displays the list illustrated in FIG. 11 or 12 on the display.

Modifications will be described hereinafter.

First Modification

In a first modification, the processor 30 of the terminal apparatus 12 owned by the user stores information indicating a history of connection to the apparatuses 14 from the terminal apparatus 12 in the memory 28 of the terminal apparatus 12 and manages the history of connection to the apparatuses 14. For example, the processor 30 of the terminal apparatus 12 stores, in the memory 28 of the terminal apparatus 12, history information including apparatus information regarding an apparatus 14 to which the terminal apparatus 12 has connected, information indicating a time of the connection, and information indicating a type of processing (e.g., printing) requested from the apparatus 14.

When displaying a list of results of a search for apparatus information, the processor 30 of the terminal apparatus 12 may or may not display apparatus images of apparatuses 14 on the display of the terminal apparatus 12 in accordance with a history of connection to the apparatuses 14 from the terminal apparatus 12.

For example, when displaying a list of results of a search for apparatus information, the processor 30 of the terminal apparatus 12 displays, on the display of the terminal apparatus 12, apparatus images of apparatuses 14 to which the terminal apparatus 12 has never connected, but does not display apparatus images of apparatuses 14 to which the terminal apparatus 12 has connected. That is, the processor 30 of the terminal apparatus 12 displays, on the display, apparatus images of apparatuses 14 for which there is no connection history information but does not display apparatus images of apparatuses 14 for which there is connection history information.

It is assumed, for example, that the terminal apparatus 12 owned by the user has connected to the apparatus 14A but has never connected to the apparatus 14B. In this case, in the example illustrated in FIG. 11, the processor 30 of the terminal apparatus 12 does not display the apparatus image 42 of the apparatus 14 in the list but displays the apparatus image 46 of the apparatus 14B in the list. In the example illustrated in FIG. 12, the processor 30 of the terminal apparatus 12 does not display the link 52 to the apparatus image 42 of the apparatus 14A in the list but displays the link 54 to the apparatus image 46 of the apparatus 14B in the list. Because history information regarding connection to the apparatus 14A is stored in the memory 28 of the terminal apparatus 12 but history information regarding connection to the apparatus 14B is not stored in the memory 28, the apparatus image 46 of the apparatus 14B or the link 54 is displayed, but the apparatus image 42 of the apparatus 14A and the link 52 are not displayed.

An apparatus 14 (e.g., the apparatus 14B) for which there is no connection history information can be an apparatus 14 that the user has never used. In this case, if an apparatus image (e.g., the apparatus image 46) of the apparatus 14 is displayed, the user can recognize the apparatus 14 that the user is going to use by referring to the apparatus image of the apparatus 14 even if the user has never used the apparatus 14. For example, an apparatus 14 for which there is no connection history information might be an apparatus 14 installed in a place that the user is visiting for a first time or an apparatus 14 that is not installed in a place that the user is visiting for the first time but that the user has never used.

An apparatus 14 (e.g., the apparatus 14A) for which there is connection history information is an apparatus 14 that the user has used. Even if an apparatus image (e.g., the apparatus image 42) of the apparatus 14 is not displayed, the user can recognize the apparatus 14 that the user is going to use.

When a predetermined period of time has elapsed since the terminal apparatus 12 connected to an apparatus 14 last time, the apparatus 14 may be treated as an apparatus to which the terminal apparatus 12 has never connected.

Second Modification

In a second modification, the processor 30 of the terminal apparatus 12 owned by the user stores, in the memory 28 of the terminal apparatus 12, apparatus information regarding apparatuses 14 to which the terminal apparatus 12 has connected. For example, the processor 30 of the terminal apparatus 12 caches apparatus information regarding apparatuses 14 to which the terminal apparatus 12 has connected.

When displaying a list of results of a search for apparatus information, the processor 30 of the terminal apparatus 12 displays the cached apparatus information on the display of the terminal apparatus 12. As for apparatus information that has not been cached, the processor 30 of the terminal apparatus 12 obtains such apparatus information from the information management apparatus 10 and displays the apparatus information on the display of the terminal apparatus 12. That is, the processor 30 of the terminal apparatus 12 displays cached apparatus information on the display of the terminal apparatus 12 for apparatuses 14 to which the terminal apparatus 12 has connected.

As a result, cached apparatus images are displayed for the apparatuses 14 to which the terminal apparatus 12 has connected. The apparatus images can be displayed without obtaining the apparatus images through a communication path such as a network.

When links to cached apparatus images are displayed as illustrated in FIG. 12 and the user clicks or touches one of the links, the corresponding cached apparatus image may be displayed.

When displaying a list of results of a search for apparatus information, the processor 30 of the terminal apparatus 12 owned by the user may inquire of the information management apparatus 10 about presence or absence of update of apparatus images stored in the memory 20 of the information management apparatus 10 (i.e., presence or absence of update of apparatus images registered in the apparatus information database). The processor 22 of the information management apparatus 10 transmits, to the terminal apparatus 12, information indicating presence or absence of update of the apparatus images in accordance with the inquiry.

If apparatus images of found apparatuses 14 have not been updated in the information management apparatus 10 in this case and apparatus information including the apparatus image is cached in the terminal apparatus 12, the processor 30 of the terminal apparatus 12 displays the cached apparatus information on the display of the terminal apparatus 12.

If an apparatus image of a found apparatus 14 has been updated in the information management apparatus 10, on the other hand, the processor 30 of the terminal apparatus 12 obtains the updated apparatus image from the information management apparatus 10 and displays the updated apparatus image on the display of the terminal apparatus 12.

That is, if an apparatus image of a found apparatus 14 has not been updated in the information management apparatus 10 and apparatus information regarding the apparatus 14 is cached in the terminal apparatus 12 when the processor 30 of the terminal apparatus 12 displays a list of results of a search for apparatus information, the processor 30 of the terminal apparatus 12 displays the cached apparatus information on the display of the terminal apparatus 12. If an apparatus image of a found apparatus 14 has been updated in the information management apparatus 10, on the other hand, the processor 30 of the terminal apparatus 12 obtains the updated apparatus image and displays the apparatus image on the display of the terminal apparatus 12 regardless of whether the apparatus information regarding the apparatus 14 has been cached in the terminal apparatus 12. That is, if an apparatus image has not been updated, a cached apparatus image is displayed, and if an apparatus image has been updated, the updated apparatus image is obtained from the information management apparatus 10 and displayed.

Third Modification

In a third modification, the processor 30 of the terminal apparatus 12 owned by the user stores, in the memory 28 of the terminal apparatus 12, apparatus information regarding apparatuses 14 to which the terminal apparatus 12 has connected. For example, the processor 30 of the terminal apparatus 12 caches apparatus information regarding apparatuses 14 to which the terminal apparatus 12 has connected.

If apparatus information regarding a found apparatus 14 is not cached in the terminal apparatus 12 when a list of results of a search for apparatus information is displayed, the processor 30 of the terminal apparatus 12 obtains the apparatus information regarding the apparatus 14 from the information management apparatus 10 and displays the apparatus information on the display of the terminal apparatus 12. In this case, the processor 30 of the terminal apparatus 12 also displays an apparatus image of the apparatus 14 on the display of the terminal apparatus 12. If apparatus information regarding a found apparatus 14 is cached in the terminal apparatus 12, the processor 30 of the terminal apparatus 12 displays, on the display of the terminal apparatus 12, information included in the apparatus information regarding the apparatus 14 other than an apparatus image of the apparatus 14 without displaying the apparatus image.

An apparatus 14 for which apparatus information has been cached in the terminal apparatus 12 is an apparatus 14 to which the terminal apparatus 12 has connected. An apparatus 14 for which apparatus information has not been cached in the terminal apparatus 12 is an apparatus 14 to which the terminal apparatus 12 has never connected. That is, when a list of results of a search for apparatus information is displayed, apparatus images of apparatuses 14 to which the terminal apparatus 12 has connected are not displayed, and apparatus images of apparatuses 14 to which the terminal apparatus 12 has never connected are displayed.

Since an apparatus 14 for which apparatus information has been cached in the terminal apparatus 12 is an apparatus 14 to which the terminal apparatus 12 owned by the user has connected in the past, it is likely that the user can easily recognize the apparatus 14 even if an apparatus image of the apparatus 14 is not displayed.

Since an apparatus 14 for which apparatus information has not been cached in the terminal apparatus 12, on the other hand, is an apparatus 14 to which the terminal apparatus 12 owned by the user has never connected in the past, it is likely that the user will not easily recognize the apparatus 14 unless an apparatus image of the apparatus 14 is displayed. If the apparatus image of the apparatus 14 is displayed in this case, the user can easily recognize the apparatus 14 compared to when the apparatus image is not displayed. Because an apparatus 14 installed in a place where the user is visiting for a first time is an apparatus 14 to which the terminal apparatus 12 owned by the user has never connected, for example, the user can easily recognize the apparatus 14 if an apparatus image of the apparatus 14 is displayed in this case, compared to when the apparatus image is not displayed.

If the apparatus information regarding the apparatus 14A is cached in the terminal apparatus 12 and the apparatus information regarding the apparatus 14B is not cached in the terminal apparatus 12 in the example illustrated in FIG. 11, for example, the processor 30 of the terminal apparatus 12 displays the apparatus image 46 of the apparatus 14B on the display without displaying the apparatus image 42 of the apparatus 14A when displaying a list of results of a search for apparatus information.

Fourth Modification

In a fourth modification, apparatus images stored in the memory 20 of the information management apparatus 10 are updated. That is, apparatus images registered in the apparatus information database are updated.

When the processor 30 of the terminal apparatus 12 owned by the manager or the user newly obtains, for an apparatus 14 shown in an apparatus image registered in the apparatus information database, another apparatus image showing the apparatus 14 and a location at which the apparatus 14 is installed (i.e., an apparatus image different from an apparatus image registered in the apparatus information database), the processor 30 requests the information management apparatus 10 to update the apparatus image.

It is possible, for example, that the manager or the user generates an apparatus image different from one registered in the apparatus information database by capturing an image of an apparatus 14 using the camera of the terminal apparatus 12 owned thereby. The apparatus image generated in this manner corresponds to a newly obtained apparatus image. Positional information is obtained by the function of obtaining positional information, such as the GPS function, at a time of the capture and associated with the newly obtained apparatus image.

The processor 30 of the terminal apparatus 12 transmits the newly obtained apparatus image associated with the positional information to the information management apparatus 10 and requests the information management apparatus 10 to update the apparatus image. For example, the processor 30 of the terminal apparatus 12 requests the information management apparatus 10 to update, to the newly obtained apparatus image, an apparatus image associated with positional information whose difference from the positional information associated with the newly obtained apparatus image falls within an allowable range.

Upon receiving the newly obtained apparatus image and the request for update, the processor 22 of the information management apparatus 10 updates, to the newly obtained apparatus, an apparatus image associated with positional information whose difference from the positional information associated with the newly obtained apparatus image falls within an allowable range among apparatus images registered in the apparatus information database. For example, the processor 22 of the information management apparatus 10 updates, to the newly obtained apparatus image, an apparatus image whose positional information matches the positional information associated with the newly obtained apparatus image.

The processor 30 of the terminal apparatus 12 may display, on the display of the terminal apparatus 12, information for prompting the user to capture another apparatus image, instead. The manager or the user captures an image of the apparatus 14 in accordance with the information.

The fourth modification will be described in detail hereinafter in a specific example.

Examples of a case where an apparatus image of an apparatus 14 is updated include a case where a location at which an apparatus 14 is installed remains the same but an environment around the apparatus 14 has changed. Examples of a case where an environment around an apparatus 14 has changed include a case where objects around an apparatus 14 have changed and a case where the layout of objects has changed.

Figure 14:
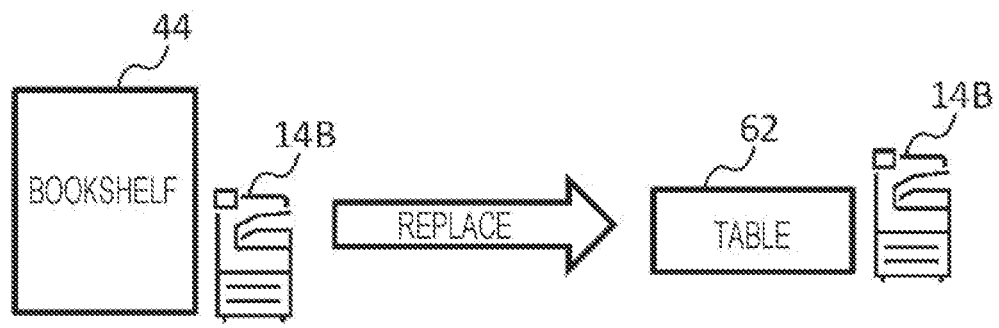
FIG. 14 is a diagram illustrating an apparatus.

As illustrated in FIG. 14, for example, the bookshelf 44 used to be placed next to the apparatus 14B, but now a table 62 has replaced the bookshelf 44 next to the apparatus 14B.

An apparatus image before the replacement is registered in the apparatus information database. That is, an apparatus image showing the apparatus 14B and the bookshelf 44 is included in apparatus information as an apparatus image of the apparatus 14B and registered in the apparatus information database. The apparatus image is associated with positional information obtained at a time of capture thereof.

When the table 62 has replaced the bookshelf 44 next to the apparatus 14B, the manager or the user might capture an image of the apparatus 14B and a scene around the apparatus 14B using the camera of the terminal apparatus 12 owned thereby such that the image includes both the apparatus 14B and the table 62. As a result, another apparatus image showing the apparatus 14B and the table 62 is generated. Positional information at a time of the capture is obtained and associated with the other apparatus image.

The terminal apparatus 12 transmits the other apparatus image showing the apparatus 14B and the table 62 to the information management apparatus 10 along with a request to update the apparatus image. Positional information associated with the apparatus image before the replacement showing the apparatus 14B and the bookshelf 44 matches positional information associated with the other apparatus image after the replacement, or a difference between these pieces of positional information falls within an allowable range. The processor 22 of the information management apparatus 10 then updates the apparatus image before the replacement showing the apparatus 14B and the bookshelf 44 and the other apparatus image after the replacement showing the apparatus 14B and the table 62. As a result, the apparatus image before the replacement showing the apparatus 14B and the bookshelf 44 is not registered in the apparatus information database but the other apparatus image after the replacement showing the apparatus 14B and the table 62 is registered in the apparatus information database as an apparatus image included in the apparatus information regarding the apparatus 14B.

The fourth modification will be further described in detail hereinafter.

Figure 15:
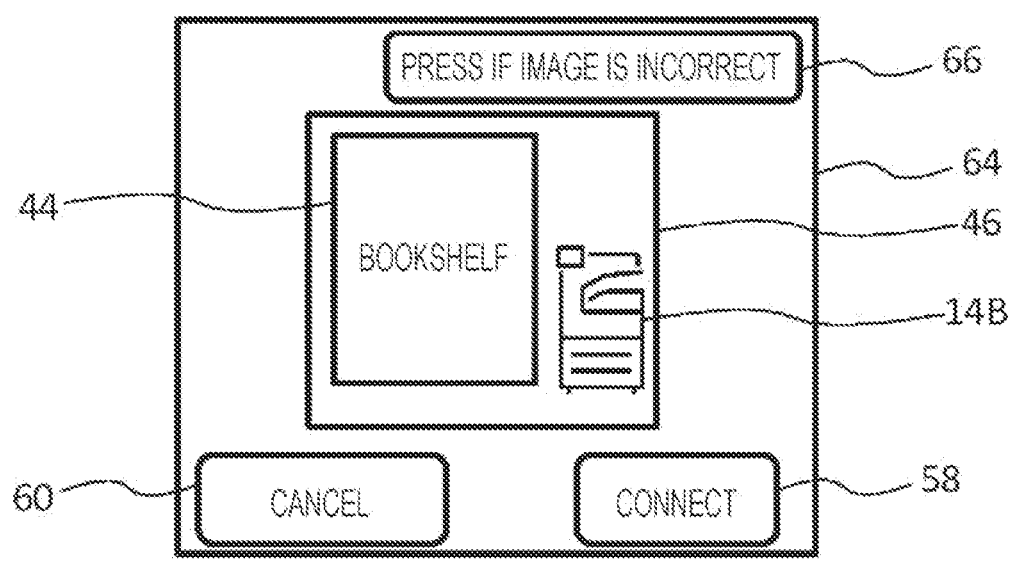
FIG. 15 is a diagram illustrating another connection screen.

FIG. 15 illustrates a screen 64 for connecting to an apparatus 14. Here, the user has selected the apparatus 14B from the list illustrated in FIG. 11 or 12, for example, and the apparatus image 46 of the apparatus 14B is displayed on the screen 64. As with the screen 56 illustrated in FIG. 13, the screen 64 includes the button 58 for requesting connection and the button 60 for canceling connection.

The screen 64 also includes a button 66 for updating an apparatus image registered in the apparatus information database. When the manager or the user presses the button 66 on the screen 64 (e.g., clicks or touches the button 66), the processor 30 of the terminal apparatus 12 displays a screen for capturing an image of an apparatus 14 on the display of the terminal apparatus 12.

Figure 16:
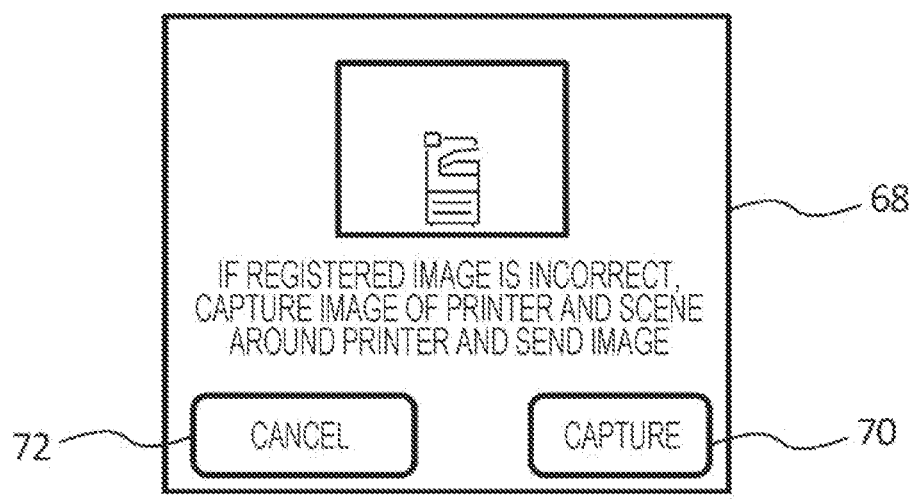
FIG. 16 is a diagram illustrating a capture screen.

FIG. 16 illustrates a screen 68 for capturing an image of an apparatus 14. When the button 66 is pressed on the screen 64, the screen 68 is displayed on the display of the terminal apparatus 12. The screen 68 includes a message for prompting the user to capture an image of an apparatus 14 and an actual scene around the apparatus 14 so that an image showing the apparatus 14 (a printer in the example illustrated in FIG. 16) and the scene, if a scene around the apparatus 14 in an apparatus image is different from the actual scene. The message is an example of information for prompting the user to capture another apparatus image.

The screen 68 also includes a button 70 for requesting capture by a camera and a button 72 for canceling capture. If the manager or the user presses the button 70 (e.g., clicks or touches the button 70), the camera of the terminal apparatus 12 captures an image. If the manager or the user presses the button 72, the screen 68 returns to the screen 64.

It is possible, for example, that after the manager changes layout around the apparatus 14B, the manager presses the button 66 on the screen 64 and the button 70 on the screen 68 to capture an image of the apparatus 14B and a scene around the apparatus 14B. In a specific example, it is possible that if the manager replaces the bookshelf 44 with the table 62 next to the apparatus 14B as illustrated in FIG. 14, for example, the manager captures an image of the apparatus 14B and the table 62 in order to generate another apparatus image showing the apparatus 14B and the table 62.

In another example, it is possible that the user selects the apparatus 14B from a list of results of a search for apparatus information in order to use the apparatus 14B. In this case, the screen 64 is displayed on the display of the terminal apparatus 12 owned by the user. Even when the table 62 is placed next to the apparatus 14B instead of the bookshelf 44, too, the apparatus image 46 before the replacement showing the apparatus 14B and the bookshelf 44 is displayed in the screen 64, if the apparatus image of the apparatus 14B has not been updated in the apparatus information database. If the user compares the scene around the apparatus 14B in the apparatus image 46 displayed in the screen 64 with an actual scene and recognizes a difference, the user might press the button 66 on the screen 64. As a result, the screen 68 for updating an apparatus image is displayed on the display of the terminal apparatus 12.

The manager or the user enables the function of obtaining positional information on the terminal apparatus 12 owned thereby and captures an image of the apparatus 14B and the table 62 using the camera of the terminal apparatus 12. As a result, another apparatus image showing the apparatus 14B and the table 62 is generated. Positional information obtained by the function of obtaining positional information is also associated with the other apparatus image.

Figure 17:
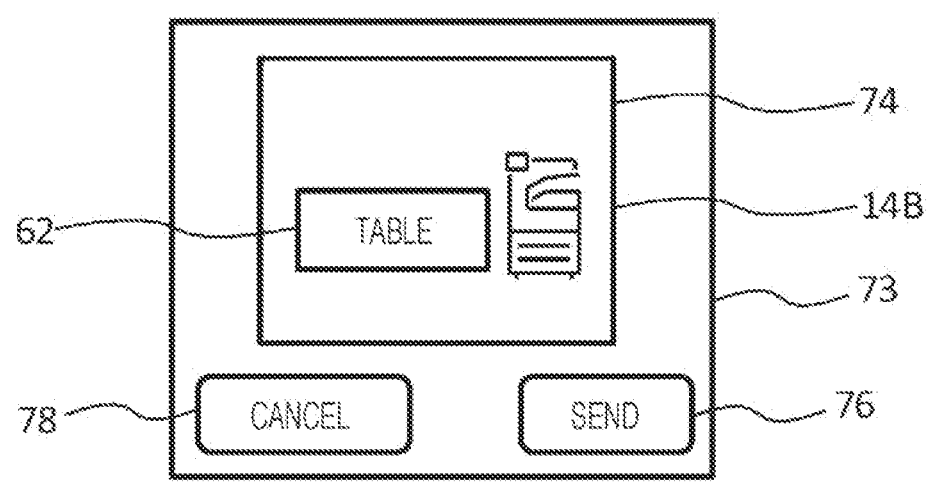
FIG. 17 is a diagram illustrating a registration screen.

FIG. 17 illustrates a screen 73 for registering another apparatus image to the apparatus information database. When the user presses the button 70 on the screen 68 to capture an image, for example, the processor 30 of the terminal apparatus 12 displays the screen 73 on the display of the terminal apparatus 12 instead of the screen 68. An apparatus image 74 generated as a result of the capture is displayed in the screen 73. When an image of the apparatus 14B and the table 62 is captured, an apparatus image 74 showing the apparatus 14B and the table 62 is generated and displayed in the screen 73. The apparatus image 74 is an example of another apparatus image of the apparatus 14B.

The screen 73 also includes a button 76 for notifying the information management apparatus 10 of a change to an apparatus image and requesting the information management apparatus 10 to update the apparatus image and a button 78 for canceling a request.

When the manager or the user presses the button 76 (e.g., clicks or touches the button 76), the processor 30 of the terminal apparatus 12 transmits, to the information management apparatus 10, information indicating the apparatus image 74, which is another apparatus image, and a request to update an apparatus image.

The processor 22 of the information management apparatus 10 updates, to the apparatus image 74, an apparatus image associated with positional information that matches positional information associated with the apparatus image 74 in the apparatus information database. In another example, the processor 22 of the information management apparatus 10 updates, to the apparatus image 74, an apparatus image associated with positional information whose difference from positional information associated with the apparatus image 74 falls within an allowable range.

For example, the positional information associated with the apparatus image 46 before the replacement showing the apparatus 14B and the bookshelf 44 matches positional information associated with the other apparatus image 74 after the replacement showing the apparatus 14B and the table 62, or a difference between these pieces of positional information falls within an allowable range. In this case, the processor 22 of the information management apparatus 10 updates the apparatus image 46 before the replacement showing the apparatus 14B and the bookshelf 44 to the other apparatus image 74 after the replacement showing the apparatus 14B and the table 62. As a result, the apparatus image 46 before the replacement showing the apparatus 14B and the bookshelf 44 is not registered in the apparatus information database but the other apparatus image 74 after the replacement showing the apparatus 14B and the table 62 is registered as an apparatus image included in the apparatus information regarding the apparatus 14B.

If a location at which an apparatus 14 is installed is changed, the manager enables the function of obtaining positional information on the terminal apparatus 12 owned thereby and captures an image of the apparatus 14 and a scene around the apparatus 14 using the camera of the terminal apparatus 12. As a result, another apparatus image of the apparatus 14 is generated. When the manager gives the terminal apparatus 12 owned thereby an instruction to update apparatus information regarding the apparatus 14 in the apparatus information database, the processor 30 of the terminal apparatus 12 transmits, to the information management apparatus 10, new apparatus information including the other apparatus image and positional information and information indicating a request to update the apparatus information regarding the apparatus 14. The new apparatus information includes a character string indicating a name of the apparatus 14, an IP address, and the like. The manager inputs the character string, the IP address, and the like. Upon receiving the new apparatus information, the processor 22 of the information management apparatus 10 updates the apparatus information regarding the apparatus 14 to the new apparatus information in the apparatus information database. If a location at which an apparatus 14 is installed is changed like this, apparatus information regarding the apparatus 14 registered in the apparatus information database is updated to new apparatus information. A user other than the manager may update apparatus information, instead.

Fifth Modification

In a fifth modification, if it is difficult to identify an apparatus 14 and a location at which the apparatus 14 is installed in an apparatus image, information for prompting a user to capture again an image of the apparatus 14 and the location at which the apparatus 14 is installed is output. For example, the information is displayed on the display of the terminal apparatus 12 owned by the user. The "user" in the fifth modification is a concept including a manager who installs and registers an apparatus 14 and a user who uses the apparatus 14. In the following description, an image with which an apparatus 14 and a location at which the apparatus 14 is installed can be identified will be referred to as an "appropriate image", and an image with which it is difficult to identify an apparatus 14 and a location at which the apparatus 14 is installed will be referred to as an "inappropriate image".

In an appropriate image, for example, the entirety of an apparatus 14 is visible, the apparatus 14 does not occupy the entirety of the image, and there are differences from apparatus images of other apparatuses 14 registered in the apparatus information database.

In an inappropriate image, for example, not the entirety of an apparatus 14 is visible, an apparatus 14 occupies the entirety of the image, or there is no difference from an apparatus image of another apparatus 14 registered in the apparatus information database.

For example, the processor 22 of the information management apparatus 10 receives an apparatus image transmitted from the terminal apparatus 12 when apparatus information is registered to the apparatus information database and determines whether the apparatus image is an appropriate image. If the apparatus image is not an appropriate image, that is, if the apparatus image is an inappropriate image, the processor 22 of the information management apparatus 10 transmits, to the terminal apparatus 12, information for prompting the user to capture an apparatus image again. The information is displayed on the display of the terminal apparatus 12.

The fifth modification will be described in detail hereinafter with reference to FIG. 18. FIG. 18 illustrates a process for determining an image.

It is assumed that the camera of the terminal apparatus 12 has been used to capture images of an apparatus 14, and images 80 and 82 have been generated.

When apparatus information is registered to the apparatus information database, or when an apparatus image registered in the apparatus information database is updated, the terminal apparatus 12 transmits the images 80 and 82 to the information management apparatus 10 (S21).

Upon receiving the images 80 and 82, the processor 22 of the information management apparatus 10 determines whether the images 80 and 82 are appropriate images (S22).

In the image 80, not the entirety of the apparatus 14 is visible, and only a part of the apparatus 14 is shown. In the image 82, the apparatus 14 occupies the entirety of the image 82, and a scene around the apparatus 14 is not shown at all. In addition, not the entirety of the apparatus 14 is visible in the image 82. The processor 22 of the information management apparatus 10, therefore, determines that the images 80 and 82 are inappropriate images (NO in S22).

After determining that the images 80 and 82 are inappropriate images, the processor 22 of the information management apparatus 10 transmits, to the terminal apparatus 12, information for prompting the user to capture an apparatus image again (S23). For example, the processor 22 of the information management apparatus 10 transmits a sample 84 of an appropriate image to the terminal apparatus 12 and displays the sample 84 on the display of the terminal apparatus 12. The user can capture an image of the apparatus 14 using the sample 84 as a guide.

An image 86 is generated as a result of second capture, for example, and the terminal apparatus 12 transmits the image 86 to the information management apparatus 10 (S24).

Upon receiving the image 86, the processor 22 of the information management apparatus 10 determines whether the image 86 is an appropriate image (S25). The image 86 shows the entirety of the apparatus 14 and the scene around the apparatus 14. The processor 22 of the information management apparatus 10, therefore, determines that the image 86 is an appropriate image (Yes in S25) and registers the image 86 to the apparatus information database as an apparatus image of the apparatus 14 (S26).

If the processor 22 of the information management apparatus 10 determines in step S22 that an image is an appropriate image, the image is registered to the apparatus information database as an apparatus image, and the information management apparatus 10 does not transmit, to the terminal apparatus 12, information for prompting the user to capture an apparatus image again.

Sixth Modification

In a sixth modification, apparatuses 14 are booths such as spaces obtained by partitioning a room or small rooms. Devices such as tables, chairs, lights, communication devices (e.g., Wi-Fi (registered trademark) routers), displays, printers, and/or air conditioners may be installed in the booths. In a certain place, a booth may be provided, plural booths may be provided in a line, plural booths may be provided at certain intervals, or plural booths may be densely provided.

A management system may manage reservations for each of the booths. A user who has reserved one of the booths is permitted to use the booth in time of the reservation. For example, a door to each of the booths is locked by an electronic lock. Information for opening the electronic lock is given to a user who has reserved one of the booth, and the user can enter the booth by opening the electronic lock with the information. The user can work in the booth. For example, the user might communicate using Wi-Fi. The booths may be used for a fee or for free.

An apparatus image according to the sixth modification is an image showing a booth and a location at which the booth is installed. When an image of a booth and a scene around the booth is captured, for example, an apparatus image showing the booth and the scene around the booth is generated. For example, a manager who installs and manages a booth captures an image of the booth to generate an apparatus image. A scene around the booth can include, for example, a signboard, a sign, a vending machine, and a public telephone. It is needless to say that the scene may include other items.

Information regarding a booth (e.g., a character string indicating a name of the booth, information regarding communication available in the booth (e.g., a service set identifier (SSID) and a password of a Wi-Fi router), and information indicating a location at which the booth is provided) and an apparatus image of the booth are included in apparatus information regarding the booth and stored in the memory 20 of the information management apparatus 10. As a result, the apparatus information regarding the booth is registered to the apparatus information database.

When the user gives the terminal apparatus 12 a search instruction by setting booth search conditions, the processor 22 of the information management apparatus 10 searches for booths that match the booth search conditions (e.g., locations at which the booths are provided and time periods for which reservations have not been made) and transmits apparatus information regarding the found booths to the terminal apparatus 12. The processor 30 of the terminal apparatus 12 displays the apparatus information regarding the found booths on the display of the terminal apparatus 12. As a result, apparatus images showing the booths and scenes around the booths are displayed on the display of the terminal apparatus 12.

Since the apparatus images showing the booths and the scenes around the booths are displayed, the user can identify a booth to be used by referring to the apparatus images. For example, the user can determine whether a booth in front thereof is a booth to be used (e.g., a booth reserved by the user) by referring to the apparatus images.

Seventh Modification

The processor 30 of the terminal apparatus 12 displays may display an apparatus image of an apparatus 14 on the display of the terminal apparatus 12 and superimposes an image indicating performance or functions of the apparatus 14 upon the apparatus image. When an apparatus 14 is a printer and the apparatus 14 has a function of a color printer, for example, an image indicating that the apparatus 14 has the function of a color printer is superimposed upon an apparatus image of the apparatus 14. Alternatively, an image indicating printing speed of the apparatus 14 or application software installed on the apparatus 14 may be superimposed upon the apparatus image.

By superimposing an image indicating performance or functions of an apparatus 14 upon an apparatus image of the apparatus 14, the user can recognize the performance or the functions of the apparatus 14 more easily than when such an image is not superimposed. For example, plural apparatuses 14 that look the same or similar to one another but whose performance or functions are different from one another might be provided. If an image indicating the performance or the functions of one of the apparatus 14 is displayed in this case, the user can easily recognize the performance or the functions.

In an example, the functions of the information management apparatus 10, the terminal apparatus 12, and the apparatus 14 are achieved through cooperation between hardware and software. For example, the processor of each of the apparatuses reads and executes a program stored in the memory of the apparatus to achieve the functions of the apparatus. The program is stored in the memory via a storage medium such as a compact disc (CD) or a digital versatile disc (DVD) or a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
 a processor configured to:
  display, on a display, a character string for identifying an apparatus that is connectable and an image showing the apparatus and a location at which the apparatus is installed, wherein
  the image is a captured image of the apparatus and a scene around the apparatus, the scene being an indication of the location at which the apparatus is installed.

2. The information processing apparatus according to claim 1, wherein the processor is configured to:
 display, on the display, access information for accessing the image; and
 display, if a user uses the access information, the image on the display.

3. The information processing apparatus according to claim 1, further comprising:
 a memory,
 wherein the processor is configured to:
  store the image in the memory if the information processing apparatus has connected to the apparatus; and
  obtain the image and display the image on the display if the memory does not store the image in a case where the processor displays, on the display, the character string for identifying the apparatus that is connectable or does not display the image on the display if the memory stores the image.

4. The information processing apparatus according to claim 2, further comprising:
 a memory,
 wherein the processor is configured to:
  store the image in the memory if the information processing apparatus has connected to the apparatus; and
  obtain the image and display the image on the display if the memory does not store the image in a case where the processor displays, on the display, the character string for identifying the apparatus that is connectable or not display the image on the display if the memory stores the image.

5. The information processing apparatus according to claim 1,
 wherein the processor is configured to display or not display the image on the display in accordance with a history of connection to the apparatus from the information processing apparatus.

6. The information processing apparatus according to claim 2,
 wherein the processor is configured to display or not display the image on the display in accordance with a history of connection to the apparatus from the information processing apparatus.

7. The information processing apparatus according to claim 1, further comprising:
 a memory,
 wherein the processor is configured to:
  store the image in the memory if the information processing apparatus has connected to the apparatus; and
  display, in a case where the processor displays, on the display, the character string for identifying the apparatus that is connectable, the image stored in the memory on the display for the apparatus to which the information processing apparatus has connected.

8. The information processing apparatus according to claim 2, further comprising:
 a memory,
 wherein the processor is configured to:
  store the image in the memory if the information processing apparatus has connected to the apparatus; and
  display, in a case where the processor displays, on the display, the character string for identifying the apparatus that is connectable, the image stored in the memory on the display for the apparatus to which the information processing apparatus has connected.

9. The information processing apparatus according to claim 7,
 wherein the image is stored in an image storage for storing images, and
 wherein the processor is configured to display the image stored in the memory on the display if the image has not been updated in the image storage and is stored in the memory in a case where the processor displays, on the display, the character string for identifying the apparatus that is connectable or, if the image has been updated in the image storage, obtain the updated image from the image storage and display the image on the display.

10. The information processing apparatus according to claim 8,
 wherein the image is stored in an image storage for storing images, and
 wherein the processor is configured to display the image stored in the memory on the display if the image has not been updated in the image storage and is stored in the memory in a case where the processor displays, on the display, the character string for identifying the apparatus that is connectable or, if the image has been updated in the image storage, obtain the updated image from the image storage and display the image on the display.

11. The information processing apparatus according to claim 1,
 wherein the image is stored in an image storage for storing images while being associated with positional information indicating a position of the apparatus, and
 wherein the processor is configured to request, if positional information associated with another image showing the apparatus and the location at which the apparatus is installed is included in an allowable range of the positional information associated with the image in a case where the other image has been obtained for the apparatus shown in the image stored in the image storage, the image storage to update the image to the other image.

12. The information processing apparatus according to claim 2,
 wherein the image is stored in an image storage for storing images while being associated with positional information indicating a position of the apparatus, and
 wherein the processor is configured to request, if positional information associated with another image showing the apparatus and the location at which the apparatus is installed is included in an allowable range of the positional information associated with the image in a case where the other image has been obtained for the apparatus shown in the image stored in the image storage, the image storage to update the image to the other image.

13. The information processing apparatus according to claim 3,
    wherein the image is stored in an image storage for storing images while being associated with positional information indicating a position of the apparatus, and
    wherein the processor is configured to request, if positional information associated with another image showing the apparatus and the location at which the apparatus is installed is included in an allowable range of the positional information associated with the image in a case where the other image has been obtained for the apparatus shown in the image stored in the image storage, the image storage to update the image to the other image.

14. The information processing apparatus according to claim 4,
    wherein the image is stored in an image storage for storing images while being associated with positional information indicating a position of the apparatus, and
    wherein the processor is configured to request, if positional information associated with another image showing the apparatus and the location at which the apparatus is installed is included in an allowable range of the positional information associated with the image in a case where the other image has been obtained for the apparatus shown in the image stored in the image storage, the image storage to update the image to the other image.

15. The information processing apparatus according to claim 5,
    wherein the image is stored in an image storage for storing images while being associated with positional information indicating a position of the apparatus, and
    wherein the processor is configured to request, if positional information associated with another image showing the apparatus and the location at which the apparatus is installed is included in an allowable range of the positional information associated with the image in a case where the other image has been obtained for the apparatus shown in the image stored in the image storage, the image storage to update the image to the other image.

16. The information processing apparatus according to claim 6,
    wherein the image is stored in an image storage for storing images while being associated with positional information indicating a position of the apparatus, and
    wherein the processor is configured to request, if positional information associated with another image showing the apparatus and the location at which the apparatus is installed is included in an allowable range of the positional information associated with the image in a case where the other image has been obtained for the apparatus shown in the image stored in the image storage, the image storage to update the image to the other image.

17. The information processing apparatus according to claim 11,
    wherein the processor is configured to:
        display, on the display, information for prompting a user to capture the other image; and
        request, if the positional information associated with the other image generated as a result of the capture is included in the allowable range of the positional information associated with the image, the image storage to update the image to the other image.

18. The information processing apparatus according to claim 1,
    wherein the image is an image generated as a result of capture, and
    wherein the processor is configured to display, if the image generated as a result of the capture is not an image with which it is difficult to identify the apparatus and the location at which the apparatus is installed, information for prompting a user to capture an image again.

19. A non-transitory computer readable medium storing a program causing a computer to execute a process comprising:
    displaying, on a display, a character string for identifying an apparatus that is connectable and an image showing the apparatus and a location at which the apparatus is installed, wherein
    the image is a captured image of the apparatus and a scene around the apparatus, the scene being an indication of the location at which the apparatus is installed.

20. An information processing method comprising:
    displaying, on a display, a character string for identifying an apparatus that is connectable and an image showing the apparatus and a location at which the apparatus is installed, wherein
    the image is a captured image of the apparatus and a scene around the apparatus, the scene being an indication of the location at which the apparatus is installed.

* * * * *